(12) United States Patent
Aghaei et al.

(10) Patent No.: US 8,405,528 B2
(45) Date of Patent: Mar. 26, 2013

(54) GESTURE BASED SMART HEADPHONE

(75) Inventors: Behzad Aghaei, Toronto (CA); Jerome Pasquero, Kitchener (CA); Steven Henry Fyke, Waterloo (CA); David Ryan Walker, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 84 days.

(21) Appl. No.: 12/784,607

(22) Filed: May 21, 2010

(65) Prior Publication Data

US 2011/0285554 A1    Nov. 24, 2011

(30) Foreign Application Priority Data

May 20, 2010   (CA) ..................................... 2702216

(51) Int. Cl.
*H03M 11/00*   (2006.01)
(52) U.S. Cl. ............. 341/33; 341/20; 174/36; D14/205; D14/223; 381/74
(58) Field of Classification Search .............. 341/20–35; D14/167, 204, 205, 223; 381/74, 312, 105; 702/158; 324/71.1; 200/18, 600
See application file for complete search history.

(56) References Cited

U.S. PATENT DOCUMENTS

| | | | | |
|---|---|---|---|---|
| 7,256,347 | B2 * | 8/2007 | Gustavsson | ................ 174/74 R |
| 2004/0037051 | A1 | 2/2004 | Hagiwara | |
| 2006/0211409 | A1 * | 9/2006 | Davis | .......................... 455/412.1 |
| 2007/0237170 | A1 * | 10/2007 | Proctor et al. | ................ 370/462 |
| 2010/0211353 | A1 | 8/2010 | Volckers | |

FOREIGN PATENT DOCUMENTS

| | | |
|---|---|---|
| WO | 2007069001 A1 | 6/2007 |
| WO | 2007069007 A1 | 6/2007 |
| WO | 2008018918 A1 | 2/2008 |
| WO | WO2009003629 | 1/2009 |

OTHER PUBLICATIONS

European search report dated Nov. 17, 2010 from corresponding European application.
http://portal.acm.org/citation.cfm?id=1085877&dl=GUIDE&coll=GUIDE&CFID=5957—Headphones with touch control.
http://www.acm.org/uist/archive/adjunct/2006/pdf/sponsored_demos/p11-buil.pdf, Touch Headphones: An Example of Ambient Intelligence.

* cited by examiner

*Primary Examiner* — Hai Phan
*Assistant Examiner* — Franklin Balseca
(74) *Attorney, Agent, or Firm* — Gowling Lafleur Henderson LLP

(57) ABSTRACT

A gesture based headphone for controlling a media player device and method for using thereof. The headphone comprises a cord with a gesture sensitive region in the cord, and an interface for connecting to the media player device. A user gesture interacts with the gesture sensitive region and generates a control input for controlling the media player device, wherein the user gesture includes at least one gesture generating a control input.

18 Claims, 8 Drawing Sheets

GESTURE BASED SMART HEADPHONE

CROSS-REFERENCE TO RELATED APPLICATIONS

This application is related to and claims priority from Canadian Application No. 2,702,216, filed on May 20, 2010, entitled "Gesture Based Smart Headphone" by Behzad AGHAEI, Jerome PASQUERO, Steven Henry FYKE and David Ryan WALKER, the entire disclosure of which is hereby incorporated by reference for all purposes.

BACKGROUND

Embodiments of the present patent disclosure relate generally to media player systems, devices, and methods employing smart headphones, and, in specific embodiments, to a gesture based smart headphone.

In recent years, there has been an explosion in the number of audio devices used for work and entertainment. Such audio devices include, but are not limited to, MP3 players; portable computing devices, such as laptops; personal digital assistants, cell phones, smart phones such as Blackberry devices; portable gaming devices; personal computers, gaming platforms; TVs, DVD players. The audio devices generally can have a headphone or earphone attached to them to augment input or output characteristics of the devices.

For example, a portable music player or a smart phone with music playing module, hereinafter referred to in general as audio device, is often used with headphones, which include one or two speakers. Headphones generally include an audio interface to the devices for receiving an audio output signal, which is then carried over a cord integrated with the audio interface to the speakers integrated with the cord at the other end.

A user usually starts playback of a playlist by interacting with a user interface of the audio device, and then stores the portable media player in a bag, a pocket. However, during the course of these tasks, the user may need to adjust the playback characteristics, including but not limited to the following: changing or muting volume levels, pausing playback, or skipping forward or backward.

This may turn out to be cumbersome. The user must retrieve the portable media player from the bag or pocket, interact with the device, and replace the player, such interaction necessarily interrupts any other tasks they are performing. In addition, the user may be distracted from another more important task, and the longer the distraction, the more likely it is that the other important task being performed by the user will be disrupted.

To alleviate these disadvantages, a physical remote that is located on headphone cord has been provided in prior art. However, the physical remote still has numerous disadvantages. These problems include: the physical remote is out of the line of sight of the user most of the time and therefore is difficult to interact with, for example, it is difficult to find which button raises the playback volume without having to look at the remote; the physical remote is no longer accessible if worn under layers of clothing or in the bag or pocket; the physical remote is a bulky mechanical apparatus which ruins the aesthetic simplicity of conventional headphones; and the physical remote may be uncomfortable to wear while moving, since it is suspended on wire, for example, it taps against the user's body while walking.

Other proposed solutions include a prototype touch headphone to control the different functions of the headphone when earpieces are being tapped on.

Accordingly, there is a need for a headphone to provide gesturer based control functions without a physical remote or a user interface on the audio device.

BRIEF DESCRIPTION OF THE DRAWINGS

These and other features of the patent disclosure will become more apparent from the following description in which reference is made to the appended drawings wherein.

DETAILED DESCRIPTION OF PREFERRED EMBODIMENTS

Figure 1:
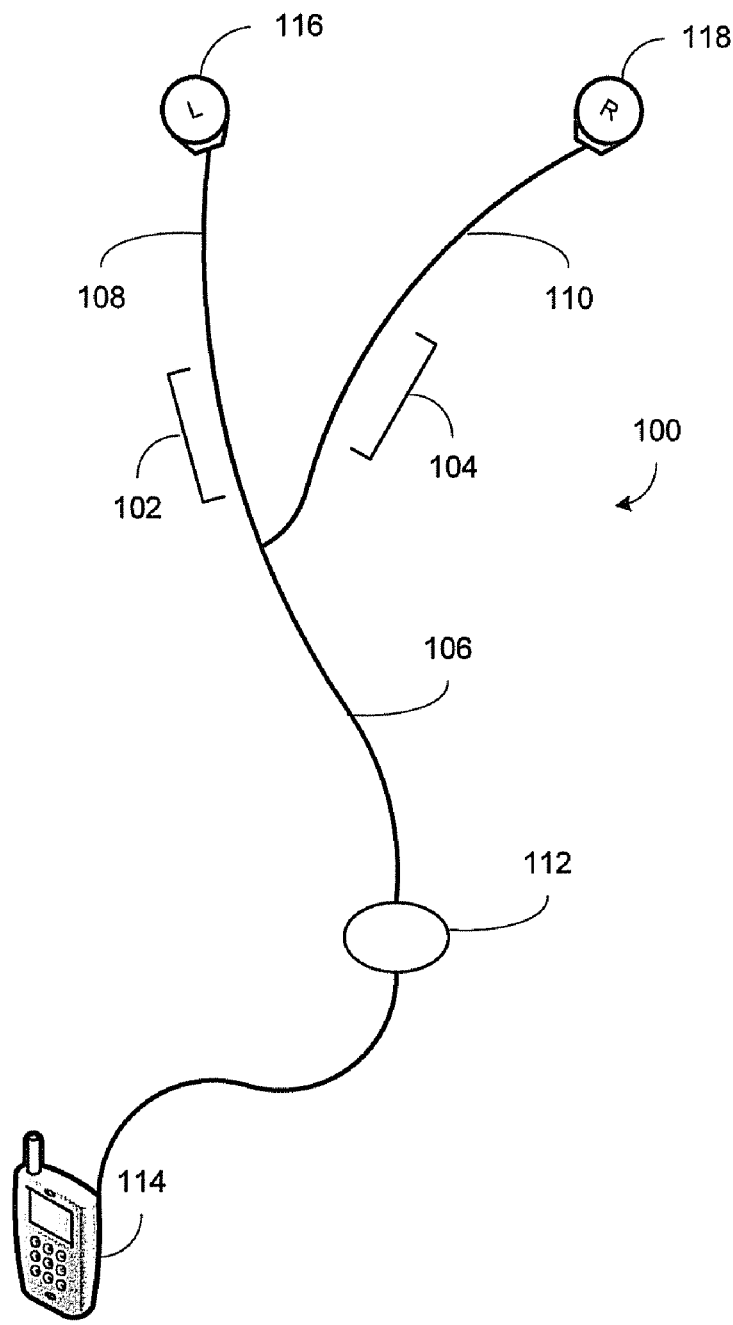
FIG. 1 illustrates an embodiment of a gesture based headphone in accordance with the patent disclosure.

In accordance with one aspect of the present patent disclosure there is provided a headphone for controlling a media player device. The media player device comprises a cord including gesture sensitive, for example but not limited to, a pressure or capacitance sensitive region in the cord; and an interface for connecting to the media player device. A user gesture interacting with the gesture sensitive region, for example but not limited to, the pressure or capacitance sensitive region generates control input for controlling the media player device. The user gesture includes a first gesture generating a first control input and a second gesture generating a second control input.

In accordance with another aspect of the present patent disclosure there is provided a method for converting a user gesture to a control signal comprising: receiving at least one user gesture at a gesture sensitive region of a gesture based headphone, wherein the at least one user gesture generates a control input; generating a signal by the gesture sensitive region based on the received user gesture, wherein the signal is utilized to control a media player device; analyzing the signal to determine an intended action at a control unit; and transmitting a second signal corresponding to the intended action to the media player device.

In accordance with another aspect of the present patent disclosure there is provided a computer readable storage medium comprising computer executable instructions for carrying out a method for converting a user gesture to a control signal comprising: receiving at least one user gesture at a gesture sensitive region of a gesture based headphone, wherein the at least one user gesture generates a control input; generating a signal by the gesture sensitive region based on the received user gesture, wherein the signal is utilized to control a media player device; analyzing the signal to determine an intended action at a control unit; and transmitting a second signal corresponding to the intended action to the media player device.

Preferably, the at least one user gesture is a first gesture generating a first control input and the gesture sensitive region detects a second gesture generating a second control input.

Preferably, the gesture sensitive region is a pressure sensitive or a capacitance sensitive region.

Preferably, the headphone further comprises headpieces, and the cord comprises an unbranched portion and branched portions leading to the headpieces, and the gesture sensitive region is located in at least one of the branched portions.

Preferably, the gesture sensitive region is located in all of the branched portions.

Preferably, the gesture sensitive region is located in the unbranched portion.

Preferably, the gesture sensitive region is uniquely marked on the cord.

Preferably, the gesture sensitive region comprises a wire capable of contacting a conductive strip of the cord.

Preferably, the media player device is part of a mobile phone.

Preferably, the gesture sensitive region comprises an array of sensors.

Preferably, the at lest one gesture is selected from the group consisting of: short press, long press, hold, swiping, sliding, pinching, rotating, touching and a combination thereof.

Preferably, the at lest one gesture is interpreted based on spatial and/or temporal differentiations.

Preferably, the headphone further comprises control unit receiving signals generated by the pressure or capacitance sensitive region.

Preferably, the media player device is a portable media player.

Preferably, the pressure sensitive region comprises a resistance measuring component.

Preferably, the gesture sensitive region comprises a first channel and a second channel, wherein the first channel carries a high frequency signal that capacitively capable of coupling with the second channel.

Preferably, the first gesture activates individual sensors of the array of sensors, and provides a gradual control.

Reference will now be made in detail to some specific embodiments of the patent disclosure. Examples of these specific embodiments are illustrated in the accompanying drawings.

In view of the foregoing, the present patent disclosure provides a user control through interacting with the wires coming from the audio headphones, that enables control of one or more aspects of operation of a media player device to which such cord is connected. In various embodiments, the user touches/pinches to the connector cord, either along a portion of the cord or the full length of the cord, in order to control the device, thus removing the need for additional remote controls. A mechanism is included for interfacing the pressure or capacitance sensitive controller to the media player device so that the pressure applied by a user can be translated to control of the media player device. In one embodiment, a headphone cord itself is an input device for volume and playback control of the media player device.

In consideration of need in the art, the present patent disclosure describes a headphone with gesture sensitive, for example but not limited to, a pressure or capacitance sensitive cord. The cord itself is a supplemental input device which removes the need for any other remote control. For applications running on a wireless device, the cord of the patent disclosure may even wholly replace the main user interface control of the wireless device. The embodiments of the present patent disclosure generally includes the following components: a pressure transducer and/or touch sensor that is integrated with the headphone cord and takes input from the user, an electronic interface between the headphone cord and the portable media player device, or an electronic interface on the headset, which can be integrated with a standard headphone jack, or provided as a separate component, and algorithms that convert the pressure/touch signal to a simple representation of user actions for interpretation by an application of the media player device to be controlled by the cord input device.

While various embodiments are described herein in the context of a headphone cord for a portable media player, it should be understood that the patent disclosure can apply to any cord attached to and communicatively coupled to a media player device where it would be desirable to control one or more aspects of the operation of the media player device with the cord. For instance, the patent disclosure may be applied effectively for a phone headset, or to any other media player device in which a component accessible to the user is attached to the media player device via a cord.

FIG. 1 illustrates an embodiment with a gesture based smart headphone 100 with two gesture sensitive regions, for example but not limited to, the pressure or capacitance sensitive regions 102, 104 along the cord 106, 108, 110 in accordance with the patent disclosure. When a user interacts with the gesture sensitive regions, for example but not limited to, the pressure or capacitance sensitive regions 102, 104, by touching or otherwise exerting pressure on the cord, the pressure creates a signal that is received by the controller unit 112 which is communicatively coupled to the media player device 114. The signal is communicated from the controller unit 112 of the headphones to the input interface of the media player 114. The signal is then interpreted to understand what gesture the user performed.

One common gesture may be sliding the user's fingers up or down the gesture sensitive regions, for example but not limited to, the pressure or capacitance sensitive regions 102, 104, thereby generating a signal. Another action may be rotating the user's fingers around the cord. Another gesture may be a press and hold with two fingers, or a grip and hold with the user's whole hand. Another gesture might be a double press, or the like.

Many uniquely touches the pressure or capacitance sensitive regions 102, 104 of the patent disclosure receive may be contemplated as a gesture. In other words, a variety of gestures can be supported, and combinations thereof, to control playback of a media player device via a cord in accordance with the patent disclosure. For embodiments that measure pressure and/or touch exerted by the user to the cord, gestures may include single press, multiple presses, short press versus long press, as well as press and hold gestures. For embodiments that support touch, and its corresponding regions on the cord, the patent disclosure may support gestures including fast swiping up the cord towards the headphone and fast swiping down the cord towards the media player device, as well as slow swiping up the cord towards the headphone and slow swiping down the cord towards the media player device.

The patent disclosure may also be embodied so that a combination of pressure and touch can be used to provide input to the cord input interface of the patent disclosure. For example, the patent disclosure may include invoking predefined input functionality when a user applies a single press gesture followed by a swipe gesture, which can be different from functionality invoked from a single press gesture alone, or a single swipe gesture alone. For a non-limiting illustration, a single press gesture followed by a swipe up gesture may invoke "volume up" functionality, whereas if the user merely performs the swipe up gesture, without the single press, "scan forward in the song" functionality may be invoked, and if the user merely performs the single press gesture, yet another functionality (including no functionality) may be performed. Thus, pressure sensor input, touch sensor input and combined pressure and touch input can be mapped to different underlying functionalities for controlling the media player device.

The gesture may be common to both pressure or capacitance sensitive regions 102, 104, for example, a double tap on any one of the both pressure or capacitance sensitive regions 102 may toggle between play and pause, a slide up may increase volume whole sliding down may decrease the volume, The gesture may also be unique to each of the pressure or capacitance sensitive regions 102, 104, for example, a pinch on the pressure or capacitance sensitive regions 102 of cord 108 leading to the left speaker 116 may indicate skip to previous track while playing music, and a pinch on the pressure or capacitance sensitive regions 104 of cord 110 leading to the right speaker 118 may indicate skip to next track while playing music.

Since each unique gesture to the gesture sensitive regions, for example but not limited to, the pressure or capacitance sensitive regions 102, 104 generates a signal that differs from other unique interactions, the controller unit 112 may determine from the signal which of the possible unique gesture was performed by the user. Once the intended action is determined, the action may be mapped to one or more existing control outputs of an existing remote control unit. The media player device 114 can interpret the received controller unit 112 output as with the existing remote control unit.

Figure 2:
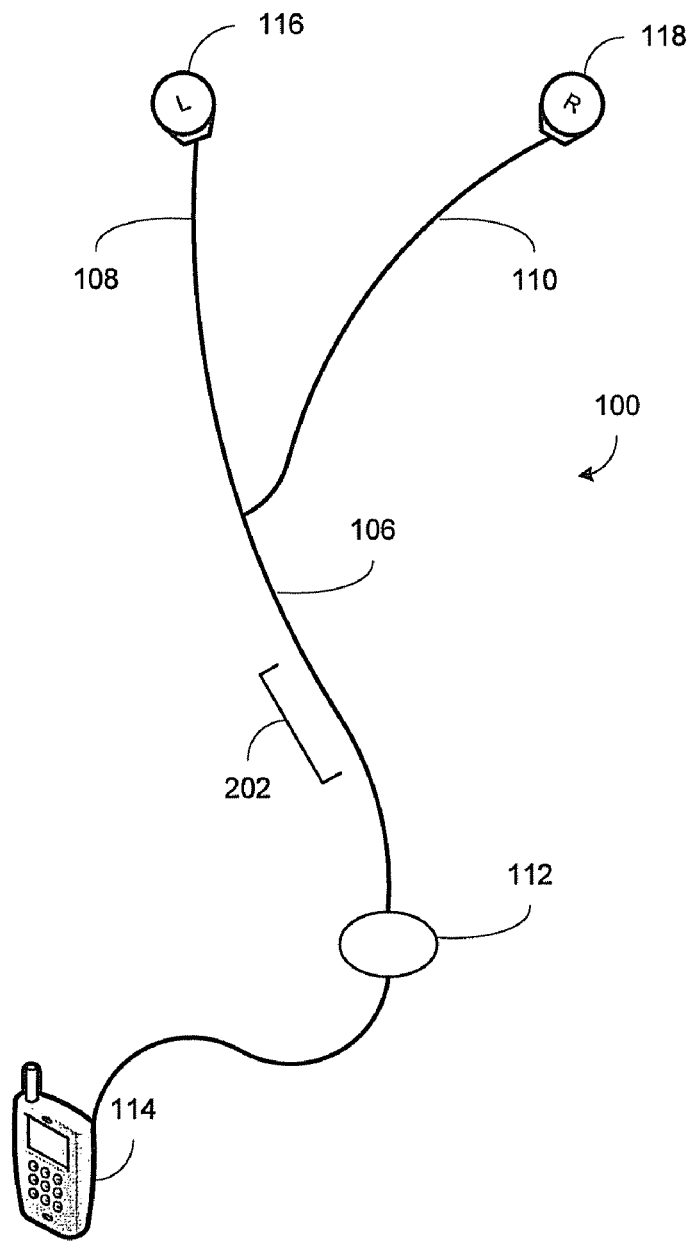
FIG. 2 illustrates another embodiment of a gesture based headphone in accordance with the patent disclosure.

In the embodiment of FIG. 1, the gesture sensitive regions, for example but not limited to, the pressure or capacitance sensitive regions 102, 104 are at the branched portions 108, 110 of the gesture based headphone. It should be apparent to a person skilled in the art that the user may be able to interact with an un-branched portion 202 of the cord as illustrated in FIG. 2, or the entire cord from the electronic controller unit 112 to the speakers.

In one embodiment, unique markings, for example but not limited to, color coding or cord surface texture may be used to indicate to a user which portions of the cord include pressure or capacitance sensitive sensors. Furthermore, it may be preferable to limit the pressure or capacitance sensitive sensors to a certain portion of the cord. With a gesture based headphone, rarely will a user have ready access to the part of the cord near the media player device itself, since that is the part of the cord that is most likely to be away from the user. Thus, if only a portion that dangles near a user's neck, chest, or stomach includes gesture sensitive, for example but not limited to, a pressure or capacitance sensitive sensor in accordance with the embodiments of the patent disclosure, then the user has ready access to the pressure or capacitance sensitive sensor, while preventing unintended or inadvertent input to other parts of the cord from affecting control of the media player device.

A variety of mechanisms may be utilized to implement pressure or capacitance sensitive sensor in accordance with embodiments of the present patent disclosure. For instance, in a capacitance sensitive embodiment, the entire cord may be implemented as a capacitance sensitive control. Depending on where the user touches the capacitance sensitive cord, varying levels of capacitance can be detected which indicate touch to the capacitance sensitive sensor, and unintended light brushing against the skin may be filtered out by calibrating capacitance sensitivity. It is also possible by providing slightly recesses capacitive sensors on the cord so that a hard push may be required to deform the sensor.

Figure 3:
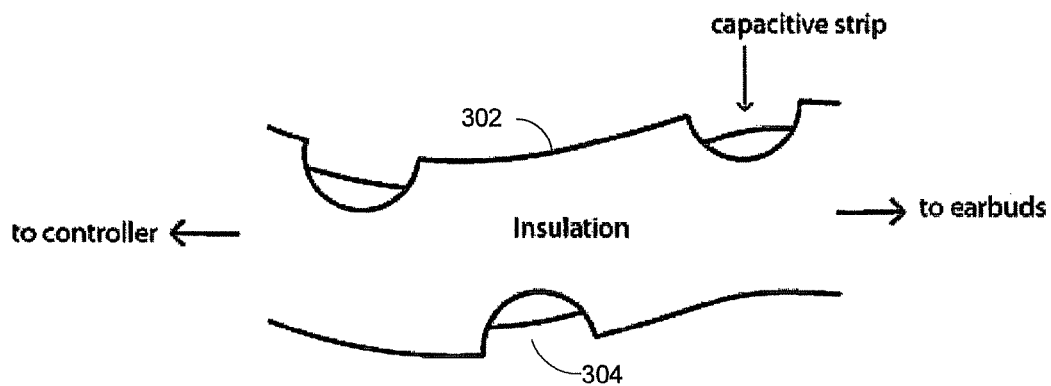
FIG. 3 illustrates one exemplary embodiment of the capacitance sensitive control.

FIG. 3 illustrates one exemplary embodiment of the capacitance sensitive control. To avoid detection errors involving unintentional skin contact, for example, the wires brushing against the neck, the insulation 302 may be exposed at certain locations along the wire, so that finger pressure may be applied at these locations simultaneously.

Figure 4:
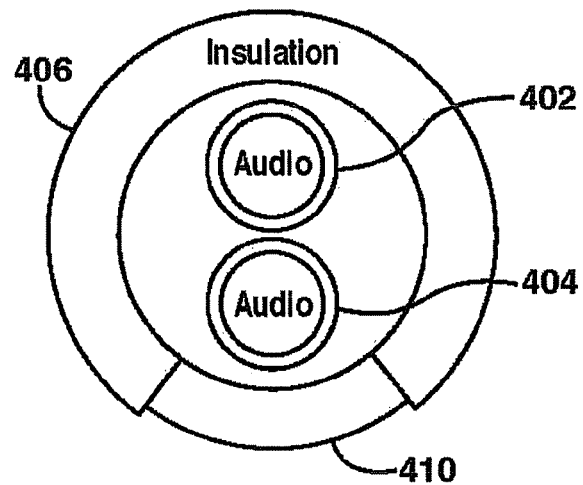
FIG. 4 shows a cross-section of the capacitance sensitive control in accordance with another embodiment of the present patent disclosure.

FIG. 4 is a cross-section of the capacitance sensitive control in accordance with another embodiment of the present patent disclosure. A plurality of audio cables 402, 404 are surrounded by insulation material 406. Two capacitance strips 410 are separated by the insulation material 406. The capacitance strips 408, 410 may be optionally exposed to the exterior at certain intervals as illustrated in FIG. 3. In order to prevent any misinterpretation of the gestures, the controller unit 112 may require that both capacitance strips 410 are touched by the user at the same time.

Figure 5:
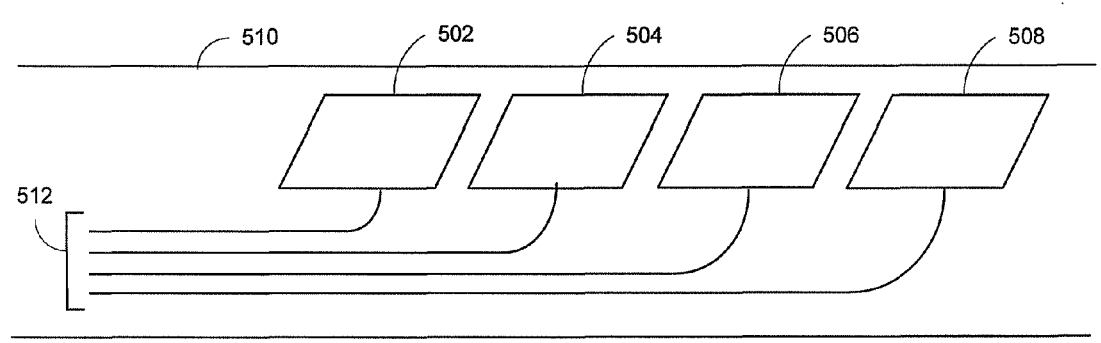
FIG. 5 shows an array of sensors arranged in the cord leading to the gesture based headphones.

FIG. 5 shows an array of sensors 502, 504, 506, 508 arranged in the cord 510 leading to the gesture based headphones. These sensors may provide signals 512 based on spatial and/or temporal differentiations of the activated sensors in the array. The sensors 502, 504, 506, 508 may be pressure or capacitance sensitive, or capacitance sensitive. The array of sensors 502, 504, 506, 508 provides an implementation for controlling the media player device where a non-binary control is desired, for example, volume control.

Volume control for headphone output is also a frequent operation of portable media players. For example, someone may begin speaking to the user of the headphone, usually implicating the need to lower the volume, and then raise the volume again after the conversation finishes. The array of sensors 502, 504, 506, 508 provides an easy access to the gradual control.

Other embodiments may include, but not limited to, mechanical sleeve, inter-channel coupling, or resistance difference or a combination thereof, depending on the application and complexity of functionality desired.

In a mechanical sleeve embodiment, the cord may include an additional wire, and a conductive, or semi-conductive sleeve. By squeezing the cord, the sleeve and wire make contact with each other, thereby completing a circuit like a simple mechanical switch.

In an inter-channel coupling embodiment, the cord includes a plurality of channels whereby one of the channels carries a high frequency signal such that when fingers pinch the cord, capacitive coupling to another channel occurs, which may be detected.

In a resistance difference embodiment, touching the cord itself varies a resistance being measured through the cord.

Figure 6:
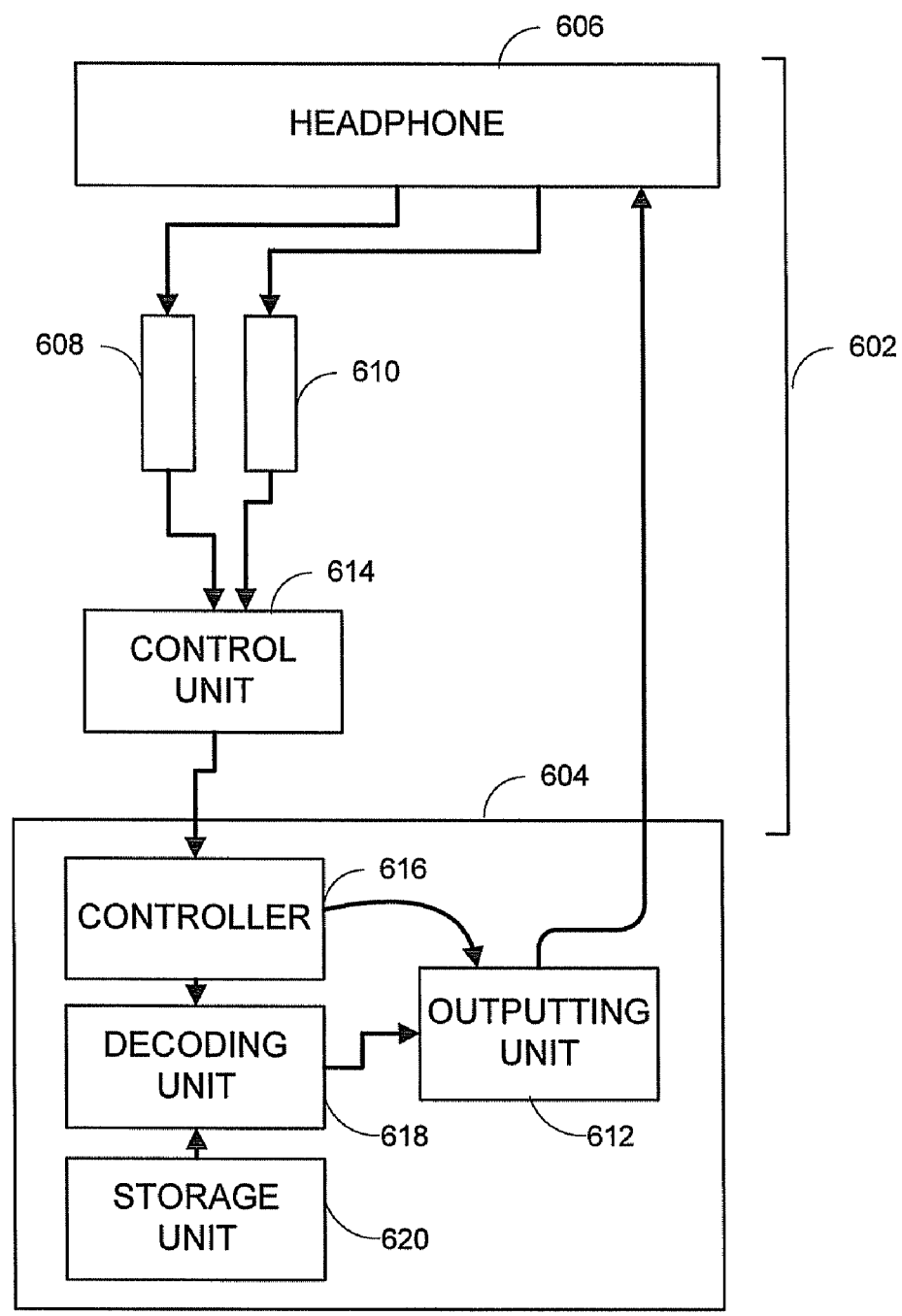
FIG. 6 shows a gesture based headphone in accordance with an exemplary embodiment, in connection with a media player.

FIG. 6 shows a gesture based headphone 602 in accordance with an exemplary embodiment, in connection with a media player 604. The gesture based headphone 602 includes an earpiece/headpiece 606 and gesture sensitive regions, for example but not limited to, the pressure or capacitance sensitive regions 608, 610. The earpiece 606 receives audio signals from an outputting unit 612 of the media player 604. The pressure or capacitance sensitive regions 608, 610 detect the gesture of the use and send the detected signal to a control unit 614 of the gesture based headphone 602.

When at least one of the sensitive regions 608, 610 detects a user gesture, for example, single tapping, the sensor sends the corresponding analog signal to the control unit 614. The control unit 614 receives the analog signal, converts the analog signal to a digital signal and interprets the meaning of the user gesture tapping as "play". The interpreted signal is then sent to the media player 604, and is received by, for example, a controller 616. The controller 616 then instructs the decoding unit 618 to decode the music stored in the storage unit 620. The storage unit 620 is configured for storing audio files readable by the decoding unit 618. The media player 604 outputs audio signals to the earpiece/headpiece 606. When a second gesture, for example, double tapping, is received at the control unit 614, a second predetermined signal is sent to the media player 604. The media player 604 stops outputting audio signals to the earpiece/headpiece 606.

Figure 7:
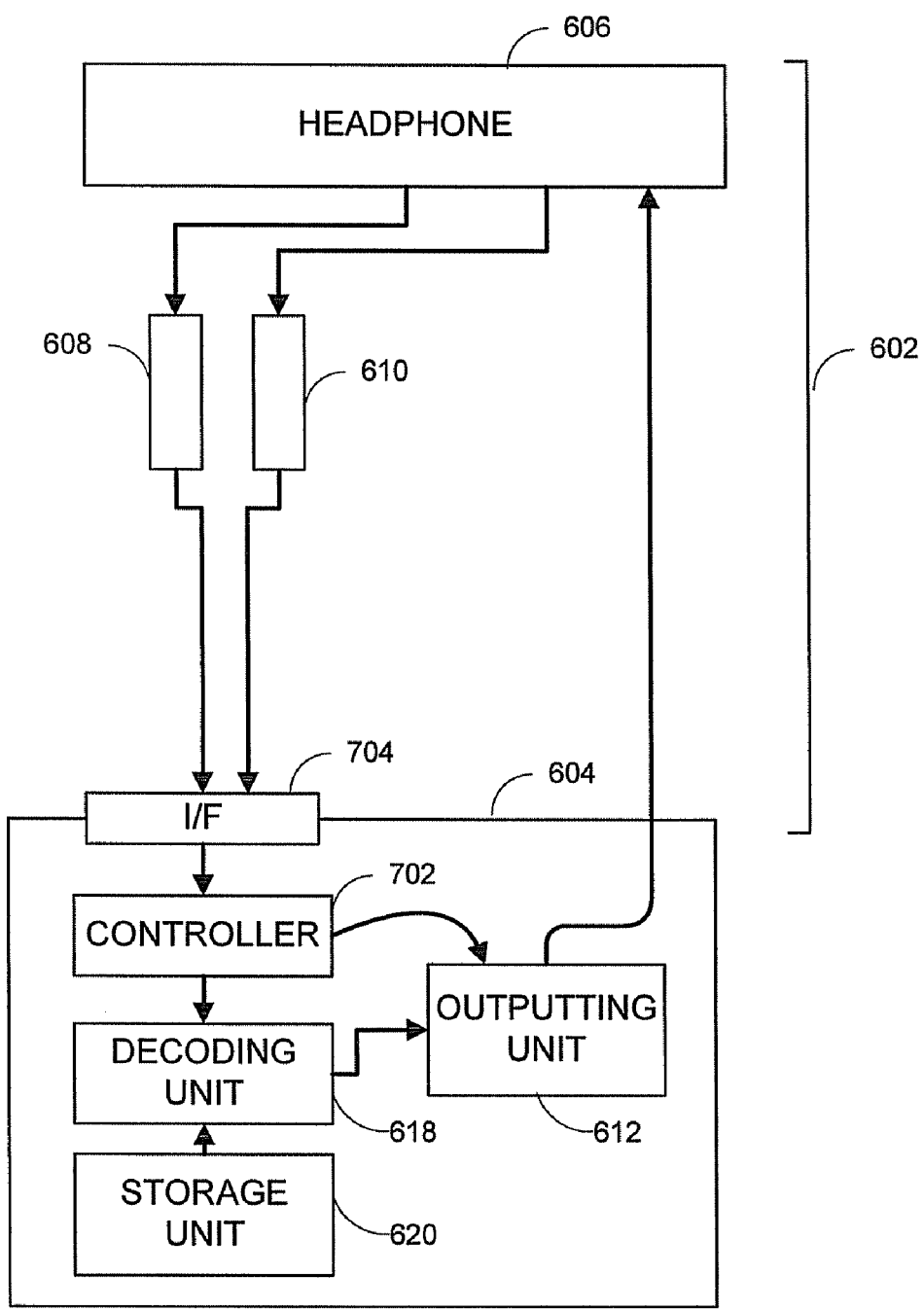
FIG. 7 shows another gesture based headphone in accordance with another exemplary embodiment, in connection with a media player.

Referring to FIG. 7, it should be apparent to a person skilled in the art that the control unit may be part of the media player 604 so that the received gesture is interpreted by the controller 702. An interface 704 may be required for the gesture based headphone 602.

Figure 8:
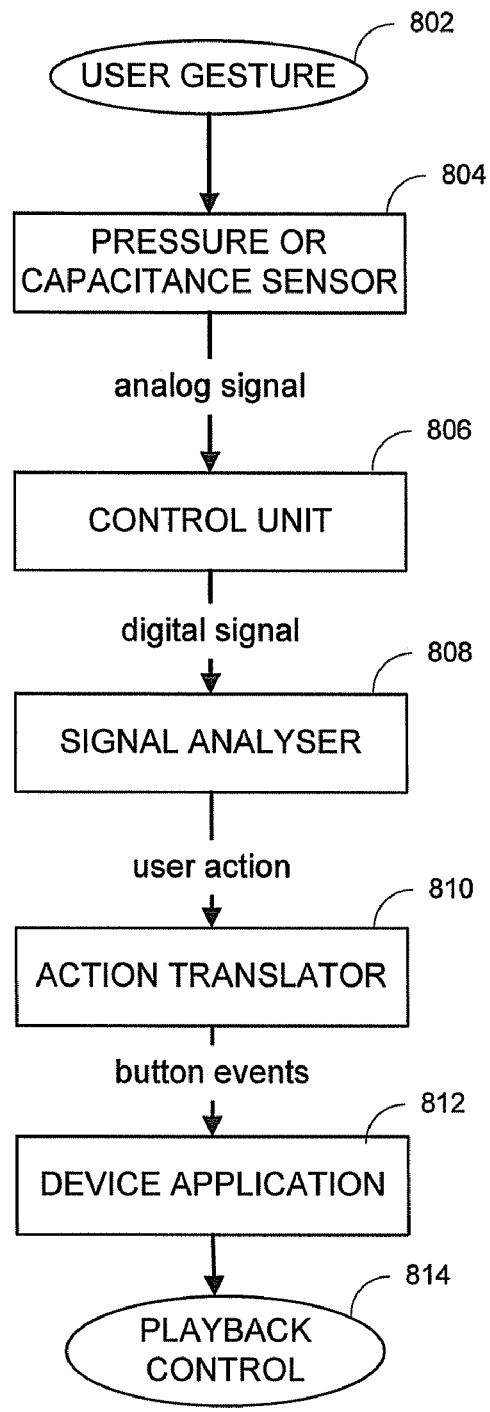
FIG. 8 shows the processing flow that occurs when a user gesture is received at the gesture based headphone.

FIG. 8 shows the processing flow that occurs when a user gesture is received at the gesture based headphone. At 802, a user provides a gesture to the gesture sensitive regions, for example but not limited to, the pressure or capacitance sensitive regions, for example, tap, press, hold, or slide. The pressure transducer and/or capacitance sensor that are in the gesture sensitive regions, for example but not limited to, the pressure or capacitance sensitive regions receive the gesture. An analog signal is generated that is representative of the gesture. The control unit 806 between the headphone and the media player device receives the analog signal. The analog signal is then converted to a digital representation prior to transmitting the signal to the media player device. The digital signal is received by a signal analyzer 808 and determined whether any user action is represented in the received digital signal. The user actions represented within the digital signal are created, input to an action translator 810. The action translator, using a set of mappings that map the set of user actions to media player device specific control inputs, translates the user action to control inputs that can be used to control the functionality of the media player device. Such button events are generated, and input to the media player device at 812, similar to how they would be received by the media player device if the user had interacted with the media player device 812 via its user interface. The functionality associated with such control inputs is carried out by the media player device 814.

Figure 9:
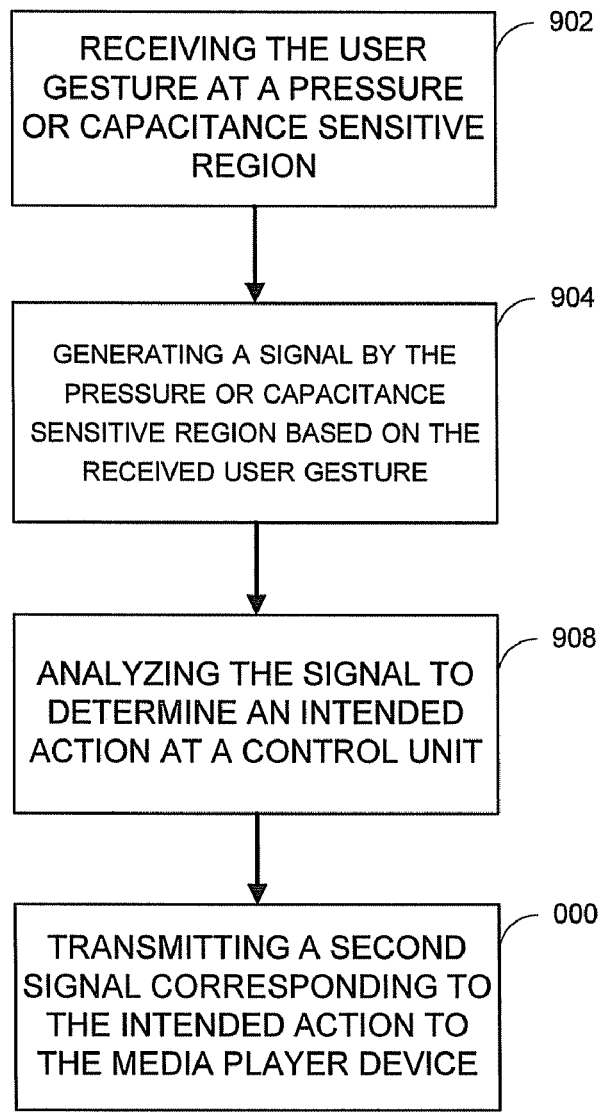
FIG. 9 shows steps of an exemplary method in accordance with an embodiment of the present patent disclosure.

FIG. 9 shows a method in accordance with an embodiment of the present patent disclosure using gesture based headphone as described in FIG. 1 and FIG. 2. After a user gesture is received at gesture sensitive, for example but not limited to, a pressure or capacitance sensitive region 102, 104, 202 of a gesture based headphone 100, a signal is generated by the gesture sensitive region, for example but not limited to, the pressure or capacitance sensitive region 102, 104, 202 based on the received user gesture, the signal is utilized to control a media player device 114. The signal is then analyzed to determine an intended action at a control unit 112; and a second corresponding to the intended action is transmitted to the media player device (114).

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise. It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

It is further understood that the use of relational terms such as first and second, and the like, if any, are used solely to distinguish one from another entity, item, or action without necessarily requiring or implying any actual such relationship or order between such entities, items or actions.

The flowchart and block diagrams in the Figures illustrate the architecture, functionality, and operation of possible implementations of systems, methods and computer program products according to various embodiments of the present patent disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of the detailed description in the above are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as "processing," "computing," "calculating," "determining," or the like, refer to the action and/or processes of a computer or computing system, or similar electronic computing media player device, that manipulate and/or transform data represented as physical, such as electronic, quantities within the computing system's registers and/or memories into other data similarly represented as physical quantities within the computing system's memories, registers or other such information storage, transmit session or display devices.

Embodiments within the scope of the present patent disclosure can be implemented in digital electronic circuitry, or in computer hardware, firmware, software, or in combinations thereof. Apparatus within the scope of the present patent disclosure can be implemented in a computer program product tangibly embodied in a machine-readable storage medium for execution by a programmable processor; and method actions within the scope of the present patent disclosure can be performed by a programmable processor executing a program of instructions to perform functions of the patent disclosure by operating on input data and generating output. Embodiments within the scope of the present patent disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present patent disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present patent disclosure may be used in a variety of applications. Although the present patent disclosure is not limited in this respect, the methods disclosed herein may be used in many apparatuses such as in the transmitters, receivers and transceivers of a radio system. Radio systems intended to be included within the scope of the present patent disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A headphone for controlling a media player device, comprising:
    a cord including a gesture sensitive region, the gesture sensitive region including two capacitance strips arranged in the cord and adapted to detect at least one user gesture for controlling the media player device, wherein the two capacitance strips are exposed at certain locations along the cord and wherein the two capacitance strips are touched simultaneously by a user at the certain locations to generate the at least one user gesture; and an interface for connecting to the media player device; wherein the at least one user gesture is interpreted based on spatial or temporal differentiations.

2. The headphone according to claim 1, wherein the at least one user gesture is a first gesture generating a first control input and the gesture sensitive region detects a second gesture generating a second control input.

3. The headphone according to claim 1, further comprising a plurality of headpieces, wherein the cord comprises an unbranched portion and branched portions leading to the plurality of headpieces, and wherein the gesture sensitive region is located in at least one of the branched portions.

4. The headphone according to claim 3, wherein the gesture sensitive region is located in all of the branched portions.

5. The headphone according to claim 3, wherein the gesture sensitive region is located in the unbranched portion.

6. The headphone according to claim 1, wherein the gesture sensitive region is uniquely marked on the cord.

7. The headphone according to claim 2, wherein the gesture sensitive region comprises a wire capable of contacting a conductive strip of the cord.

8. The headphone according to claim 1, wherein the media player device is part of a mobile phone.

9. The headphone according to claim 1, wherein the gesture sensitive region comprises an array of sensors.

10. The headphone according to claim 1, wherein the at least one gesture comprises at least one of: short press, long press, hold, swiping, sliding, pinching, rotating or touching.

11. The headphone according to claim 10, wherein the at least one gesture activates individual sensors of the array of sensors, and provides a gradual control.

12. The headphone according to claim 1, further comprising control unit receiving signals generated by the gesture sensitive region.

13. A media player device used with the headphone of claim 1.

14. The headphone according to claim 1, wherein the gesture sensitive region comprises a first channel and a second channel, wherein the first channel carries a high frequency signal that capacitively capable of coupling with the second channel.

15. The headphone according to claim 1, wherein the media player device is a portable media player.

16. A method for converting a user gesture to a control signal comprising:
    receiving at least one user gesture at a gesture sensitive region in a cord of a headphone, wherein the at least one user gesture generates a control input and wherein the gesture sensitive region including two capacitance strips arranged in the cord, wherein the two capacitance strips are exposed at certain locations along the cord and wherein the two capacitance strips are touched simultaneously by a user at the certain locations to generate the at least one user gesture;
    generating a signal by the gesture sensitive region based on spatial or temporal differentiations, wherein the signal is utilized to control a media player device;
    analyzing the signal to determine an intended action at a control unit; and
    transmitting a second signal corresponding to the intended action to the media player device.

17. A non-transitory computer readable medium comprising computer executable instructions for carrying out the method of claim 16.

18. A headphone, comprising:

a cord including a gesture sensitive region, the gesture sensitive region including two capacitance strips arranged in the cord and adapted to produce a signal in response to detection of a user gesture, wherein the two capacitance strips are exposed at certain locations along the cord and wherein the two capacitance strips are touched simultaneously by a user at the certain locations to generate the at least one user gesture;

a control unit operative to receive the signal produced by the gesture sensitive region and to generate a control input; and an interface to couple the control input to a media player device, wherein the user gesture is interpreted based on spatial or temporal differentiations.

\* \* \* \* \*